(No Model.)
W. A. VAN DEUSEN.
FILTERING POT OR URN.
No. 544,140. Patented Aug. 6, 1895.
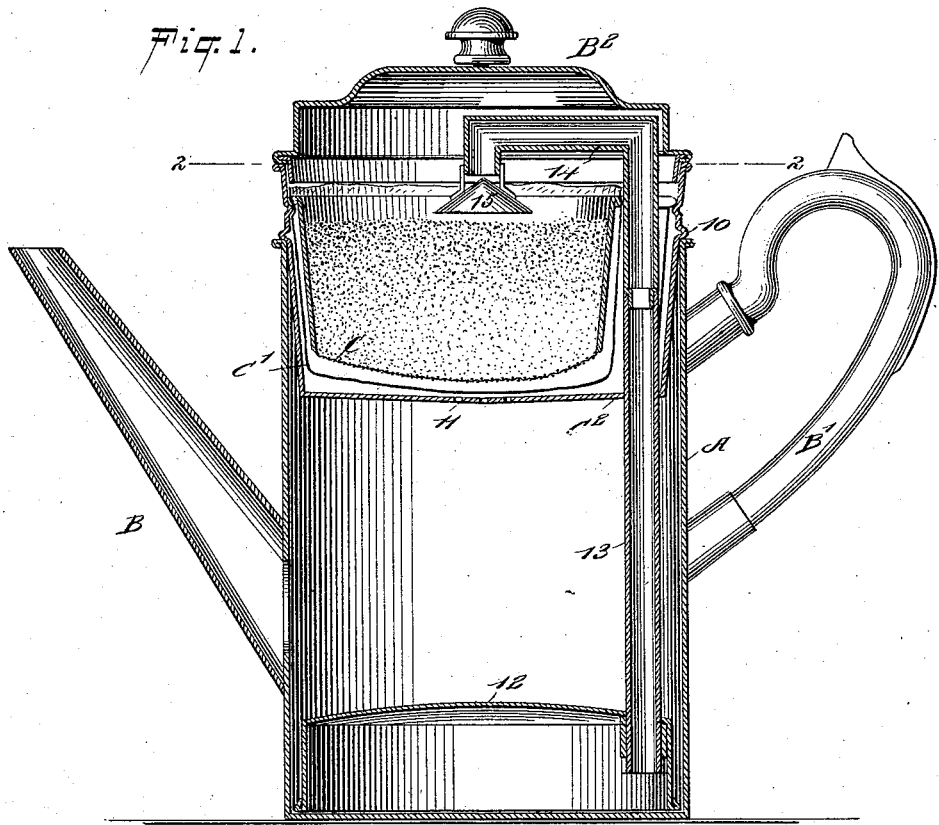
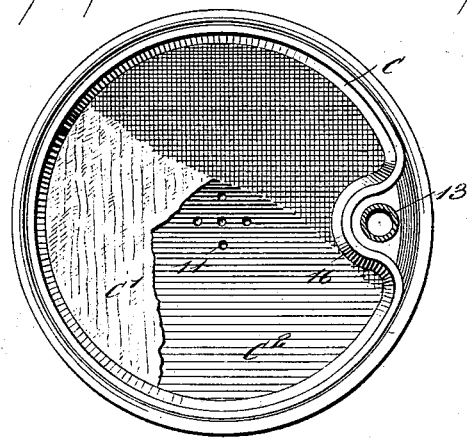
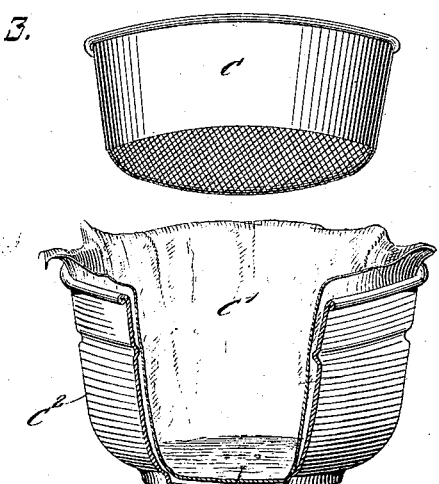
WITNESSES:
William Goebel
J. Fred Acker
INVENTOR
W. A. Van Deusen
BY
ATTORNEYS.

UNITED STATES PATENT OFFICE.

WILLIAM A. VAN DEUSEN, OF BROOKLYN, NEW YORK.

FILTERING POT OR URN.

SPECIFICATION forming part of Letters Patent No. 544,140, dated August 6, 1895.

Application filed October 4, 1894. Serial No. 524,920. (No model.)

*To all whom it may concern:*

Be it known that I, WILLIAM A. VAN DEUSEN, of Brooklyn, in the county of Kings and State of New York, have invented a new and Improved Filtering Pot or Urn, of which the following is a full, clear, and exact description.

My invention relates to a filtering pot or urn; and it has for its object to provide a vessel of that character in which an exceedingly-clear decoction may be produced with the least possible trouble, and whereby also, when desired, a perfect circulation of water may be obtained through the material from which the decoction is to be made, in the event the water should be suffered to boil.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a vertical central section through a coffee-pot having the improvement applied thereto. Fig. 2 is a horizontal section taken essentially on the line 2 2 of Fig. 1; and Fig. 3 is a detail view illustrating the strainer, the filter, and the drip-bowl.

In carrying out the invention the body A of the coffee-pot may be of any desired shape, being usually provided with a spout B and a handle B', together with a top B², which may be hinged to the body or may be otherwise attached thereto.

The essential feature of the invention consists in what may be termed a "strainer" bowl or cup C, a filtering material C', and a drip bowl or cup C². The strainer bowl or cup, together with the drip-bowl, will be of a contour in cross-section substantially corresponding to that of the body of the pot into which they are to be introduced and in which they extend downward a predetermined distance.

The drip bowl or cup C² may be made to rest at its upper edge upon the upper edge of the body of the coffee-pot A, or it may be provided with an exterior flange 10, as shown in Fig. 1, whereby its upper edge will be held a predetermined distance above the upper edge of the body of the pot. The strainer-bowl C is adapted to enter the drip bowl or cup C², and its upper edge may be located a predetermined distance from the upper edge of the drip bowl or cup, while the bottom of the strainer bowl or cup will be placed a predetermined distance from the bottom of the drip-bowl, as illustrated in Fig. 1.

In the bottom of the drip bowl or cup a series of drip-apertures 11 is produced, and said apertures are usually produced in the central portion of the bottom of the said bowl or cup; whereas, the bottom of the strainer bowl or cup C is of a perforated or a reticulated material of more or less fine mesh. Usually the bottom consists of a wire sieving, as illustrated in the drawings.

A filtering material C' is located between the strainer cup or bowl and the drip cup or bowl; and the said filtering material preferably consists of a paper filter formed in a suitable shape, in order that it may practically surround the strainer cup or bowl and be contained within the drip bowl or cup, as illustrated in Fig. 1.

It should be noticed that the filtering-paper is loose between the drip-cup and strainer as distinguished from being drawn taut therebetween, also that the drip-cup and strainer are so spaced that the filtering-paper will, by the weight of the fluid upon it, sag to and be supported by the drip-cup, avoiding any cracking or breaking of the paper filter.

The coffee, which is ground finely, is placed in the strainer bowl or cup, and after the filtering material has been placed in the drip bowl or cup the strainer-bowl is placed in the filtering material, as shown also in Fig. 1, and as is indicated in Fig. 3. The drip bowl or cup is then placed in the body of the coffee-pot, extending downward therein to a predetermined distance from the bottom, and hot water is then poured into the strainer bowl or cup and will percolate through the ground coffee contained therein, the liquid product being filtered by the material C' surrounding the said strainer bowl or cup, and the filtered material will thereupon drip through the apertures 11 in the drip bowl or cup into the bottom portion of the body A of the pot, and the consequence will be that the liquid coffee will be exceedingly clear and will have greater strength than heretofore attainable in any style of filtering coffee-pot. Sometimes, however, it is desirable that the liquid shall be boiled, and when this is desirable a removable false bottom 12 is placed in the bottom of the body of the coffee-pot, as shown in Fig. 1, the false bottom being of less diameter than that of the said body of the pot, and forming a steam-chamber at the base of the pot. A tube 13 is projected upward from this steam-chamber, having communication with its interior below the upper wall thereof. The said tube is made to extend upward through the drip bowl or cup and above the straining bowl or cup and may be made in one or in more than one section. The said tube 13 is then provided with a horizontal branch 14, extending over and above the strainer bowl or cup and thence downward from the center thereof, terminating preferably in a conical deflector 15.

It will be understood that the tube 13 is so arranged relatively to the drip bowl or cup $C^2$ as to be readily detachable therefrom when it is desired to remove the float from the coffee-pot, and to effect this result said tube may either extend upward, as above set forth and shown in Figs. 1 and 2, through the drip bowl or cup, or the latter may be curved in its periphery or side surface to receive said tube. Preferably the tube extends directly through the drip-bowl, as shown in the drawings, and the strainer cup or bowl is provided with a concavity 16 (shown in Fig. 2) to receive said tube. In this construction the tube is constructed in two sections threaded together, in order that the said sections may be detached from one another to permit of readily removing the float and tube from the coffee-pot.

When the tube and float are employed, water may be placed in the bottom portion of the coffee-pot and heat applied to the bottom thereof, whereupon steam will collect in the upper part of the float above the lower end of the tube, so that the hot water at the base of the float will be forced up through the tube and permitted to percolate through the grounds arranged in the strainer-bowl.

It will be evident that while the invention is shown and described as applicable to the preparation of coffee, it may be utilized in making tea or other decoctions.

Having thus described my invention, I claim as new and desire to secure by Letters Patent—

1. The combination of a coffee-pot or the like, a drip-cup located therein and provided with a foraminous bottom, a strainer bowl or cup adapted to contain the coffee, said strainer bowl being also provided with a foraminous bottom located above the bottom of the drip-cup and a paper filter arranged loosely between the drip cup and strainer bowl bottoms, said filter being relieved from pressure by the latter, the drip cup and strainer being so spaced that the filtering paper will, by the weight of the fluid upon it, sag to and be supported by the drip cup, substantially as set forth.

2. The combination of a coffee pot or the like having a drip-cup, provided with a perforated bottom, a removable false bottom arranged in the lower part of the pot, above the bottom thereof whereby a steam chamber is formed between the false bottom and the bottom of the pot, a tube communicating at its lower end with the steam chamber and having its upper end extending through the drip-cup, and having a branch projecting laterally from it above the drip-cup, said tube being formed of two sections threaded together and independent of the drip-cup and coffee pot, and a strainer bowl adapted to be supported in the drip-cup and having a concavity formed in its side wall to receive said tube, substantially as set forth.

WILLIAM A. VAN DEUSEN.

Witnesses:
J. FRED ACKER,
C. SEDGWICK.